United States Patent
Avalon et al.

(10) Patent No.: US 10,794,129 B2
(45) Date of Patent: Oct. 6, 2020

(54) SCREEN DUMP STATION SYSTEM FOR DISPOSING OF SPENT DRILLING MUD

(71) Applicant: American Augers, Inc., West Salem, OH (US)

(72) Inventors: Thomas M. Avalon, Seville, OH (US); Richard Levings, Perry, OK (US); Michael L. Anderson, Temecula, CA (US)

(73) Assignee: The Charles Machine Works, Inc., Perry, OK (US)

( * ) Notice: Subject to any disclaimer, the term of this patent is extended or adjusted under 35 U.S.C. 154(b) by 327 days.

(21) Appl. No.: 15/661,289

(22) Filed: Jul. 27, 2017

(65) Prior Publication Data
US 2018/0030795 A1 Feb. 1, 2018

Related U.S. Application Data

(60) Provisional application No. 62/367,267, filed on Jul. 27, 2016.

(51) Int. Cl.
| | |
|---|---|
| E21B 21/06 | (2006.01) |
| B07B 13/16 | (2006.01) |
| B07B 1/46 | (2006.01) |
| C02F 1/00 | (2006.01) |
| C02F 9/00 | (2006.01) |
| C02F 11/121 | (2019.01) |
| B01D 33/03 | (2006.01) |

(Continued)

(52) U.S. Cl.
CPC ........ *E21B 21/065* (2013.01); *B01D 33/0353* (2013.01); *B07B 1/46* (2013.01); *B07B 13/16* (2013.01); *C02F 1/004* (2013.01); *C02F 9/00* (2013.01); *C02F 11/121* (2013.01); *E03F 5/14* (2013.01); *B07B 2230/01* (2013.01); *C02F 2103/10* (2013.01)

(58) Field of Classification Search
CPC .......... E21B 21/065; C02F 1/004; C02F 9/00; C02F 11/121; C02F 2103/10; B01D 33/0353; B07B 13/16; B07B 1/46; B07B 2230/01; E03F 5/14
See application file for complete search history.

(56) References Cited

U.S. PATENT DOCUMENTS 3,777,405 A * 12/1973 Crawford .............. E21B 21/066
  34/591
5,223,154 A * 6/1993 MacPherson, Jr. .. B01D 24/002
  210/790

(Continued)

OTHER PUBLICATIONS thunder-products.com, "Thunder Prescreen a Wyo-Ben Product", article, undated, 3 pages, Ponder, TX.

(Continued)

*Primary Examiner* — Liam Royce
(74) *Attorney, Agent, or Firm* — Tomlinson McKinstry, P.C.

(57) ABSTRACT

A processing system for a slurry material. The system has a vibratory screen disposed atop an open-topped tank. A travel path for a vehicle is disposed directly above the screen and the tank. Slurry material dumped from the vehicle onto the screen is separated at the screen into a particulate-rich stream and a fluid-rich stream. The fluid-rich stream may be pumped to a cleaner so that it may be stored and re-used as drilling fluid.

19 Claims, 10 Drawing Sheets

(51) Int. Cl.
*E03F 5/14* (2006.01)
*C02F 103/10* (2006.01)

(56) References Cited

U.S. PATENT DOCUMENTS

| | | | | |
|---|---|---|---|---|
| 5,261,433 | A * | 11/1993 | Smith | B60S 3/042 |
| | | | | 134/123 |
| 5,788,410 | A * | 8/1998 | Stucks | E03F 5/16 |
| | | | | 405/107 |
| 5,814,230 | A * | 9/1998 | Willis | B01D 21/12 |
| | | | | 210/710 |
| 10,722,919 | B2 | 7/2020 | Beach et al. | |
| 10,737,202 | B2 | 8/2020 | Sharpe et al. | |
| 2002/0134550 | A1 * | 9/2002 | Leeson | E21B 21/066 |
| | | | | 166/266 |
| 2003/0205257 | A1 * | 11/2003 | Gross | B60S 3/04 |
| | | | | 134/123 |
| 2007/0017862 | A1 * | 1/2007 | Shaver | B08B 3/02 |
| | | | | 210/513 |
| 2008/0078699 | A1 * | 4/2008 | Carr | E21B 21/065 |
| | | | | 209/233 |
| 2012/0080185 | A1 * | 4/2012 | Jackson | E21B 21/065 |
| | | | | 166/267 |

OTHER PUBLICATIONS

Western Oilfields Supply Company, "Wheel Wash ConLine 800C", catalog page, undated, 1 page.

* cited by examiner

SCREEN DUMP STATION SYSTEM FOR DISPOSING OF SPENT DRILLING MUD

CROSS REFERENCE TO RELATED APPLICATIONS

This application claims the benefit of U.S. Provisional Patent Application No. 62/367,267, filed Jul. 27, 2016, the entire contents of which are incorporated herein by reference.

FIELD

The present invention relates to a method for disposing of spent drilling mud.

SUMMARY

The invention is directed to a system. The system comprises a vehicle travel path defined by a first ramp, a second ramp, and a dumping station. The dumping station is disposed between the two ramps and comprises a screen and a tank. The tank is disposed directly beneath the screen and the vehicle travel path. A slurry material flowpath is defined above and on the screen. The screen separates the slurry material into a particulate-rich flowpath and a fluid-rich flowpath.

The invention is also directed to a method. The method comprises supporting at least a portion of a vehicle on a bridge having spaced-apart tracks. A slurry is received from the vehicle at a screen disposed between the spaced-apart tracks. The slurry is separated into a fluid-rich portion and a particulate-rich portion with the screen. The fluid-rich portion is received in a tank disposed directly below the screen. At least some of the fluid-rich portion is cleaned to prepare a drilling fluid.

The invention is also directed to an apparatus. The apparatus comprises a bridge, a screen, a vibrator, a tank, and a conveyor. The bridge has a spaced pair of tracks. The screen is disposed between the pair of tracks. The vibrator is operatively connected to the screen. The tank is disposed directly below the screen and the tracks. The conveyor is disposed at an end of the screen.

The invention is also directed to a system. The system comprises a forward travel path, a screen, and an open-topped tank. The forward travel path is for a wheeled vehicle and includes a partially open platform. The screen is situated beneath the platform. The open-topped tank is situated beneath the screen.

DETAILED DESCRIPTION

Drilling fluid is utilized in underground construction operations, such as horizontal directional drilling, to form an underground construction location used to dislodge the underground material. This material travels up a borehole as "spent mud". The spent mud may be removed from the work site and collected in a vacuum tank.

Spent mud presents disposal problems. The spent mud contains the original drilling fluid—a valuable material for use in drilling operations. However, dislodged soil, rocks, and other debris is present in the spent mud, creating a slurry that is inappropriate for immediate reuse.

Further, environmental regulations in some jurisdictions make the deposit of wet material on the ground inappropriate. So while larger particulates contained in a spent mud slurry may be valuable as ground fill, it often cannot be placed in a landfill while wet. Therefore, a system to easily deposit spent mud in a way that removes and dries particulates while recycling material for reuse as drilling mud is advantageous.

Figure 1:
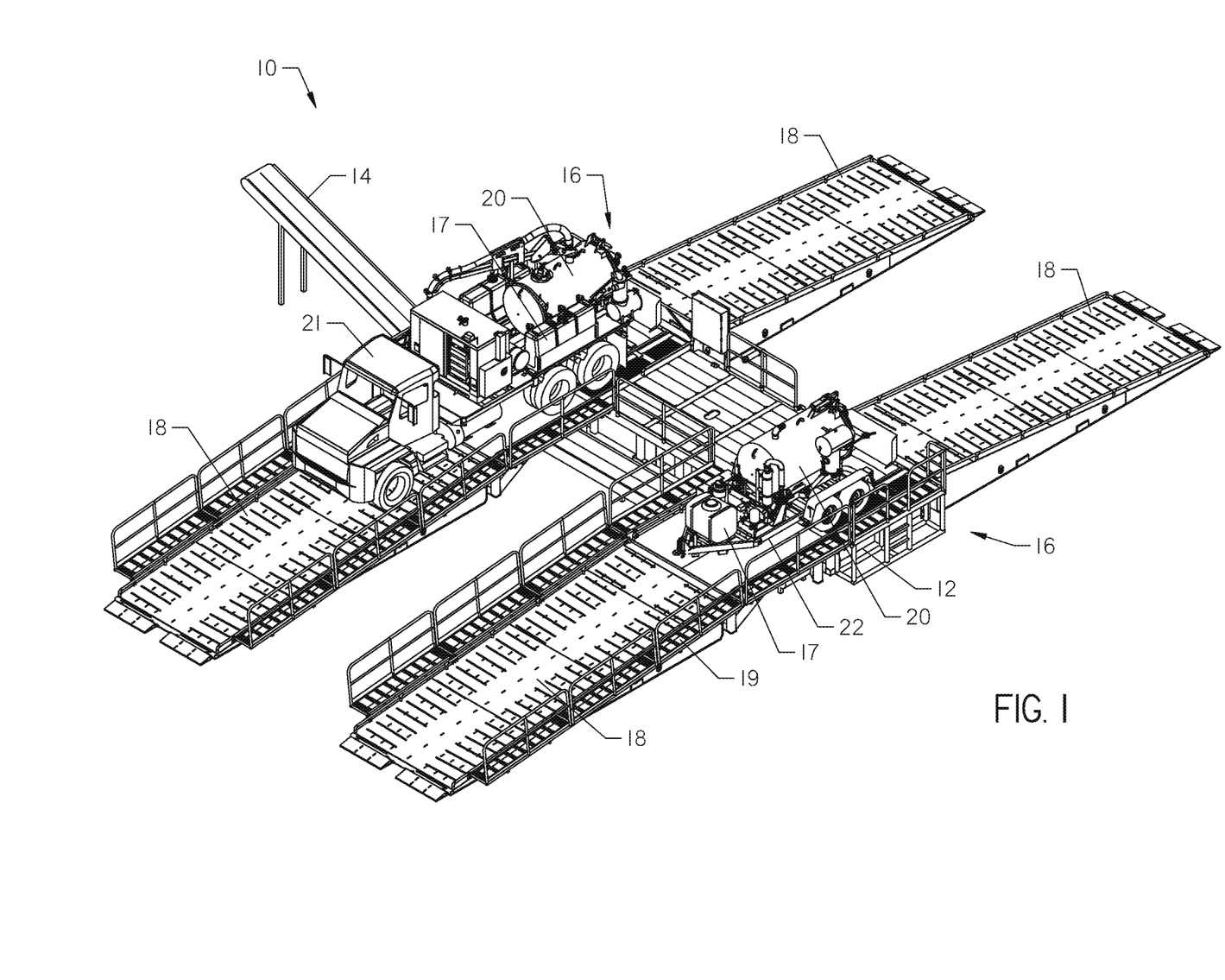
FIG. 1 is an overhead isometric view of a material processing system with a vacuum truck and trailer disposed at a dumping station.

Referring to FIG. 1, a material processing system 10 is shown. The system comprises a processing tank 12, a material conveyer 14, one or more dumping stations 16, and a plurality of ramps 18. As shown, the system 10 comprises two dumping stations 16, each with a pair or ramps 18 leading to a corresponding dumping station 16. The dumping stations 16 are accessible by a pedestrian from the ground by one or more catwalks 19 supported next to at least one of the plurality of ramps 18.

Each dumping station 16, along with the ramps 18, defines a vehicle travel path that may accommodate a vehicle tank 20. As shown, the vehicle tank 20 may be supported by a truck 21 or trailer 22. Each truck 21 or trailer 22 may also comprise auxiliary tanks 17 for transporting water and clean drilling mud to a drill site.

Figure 10:
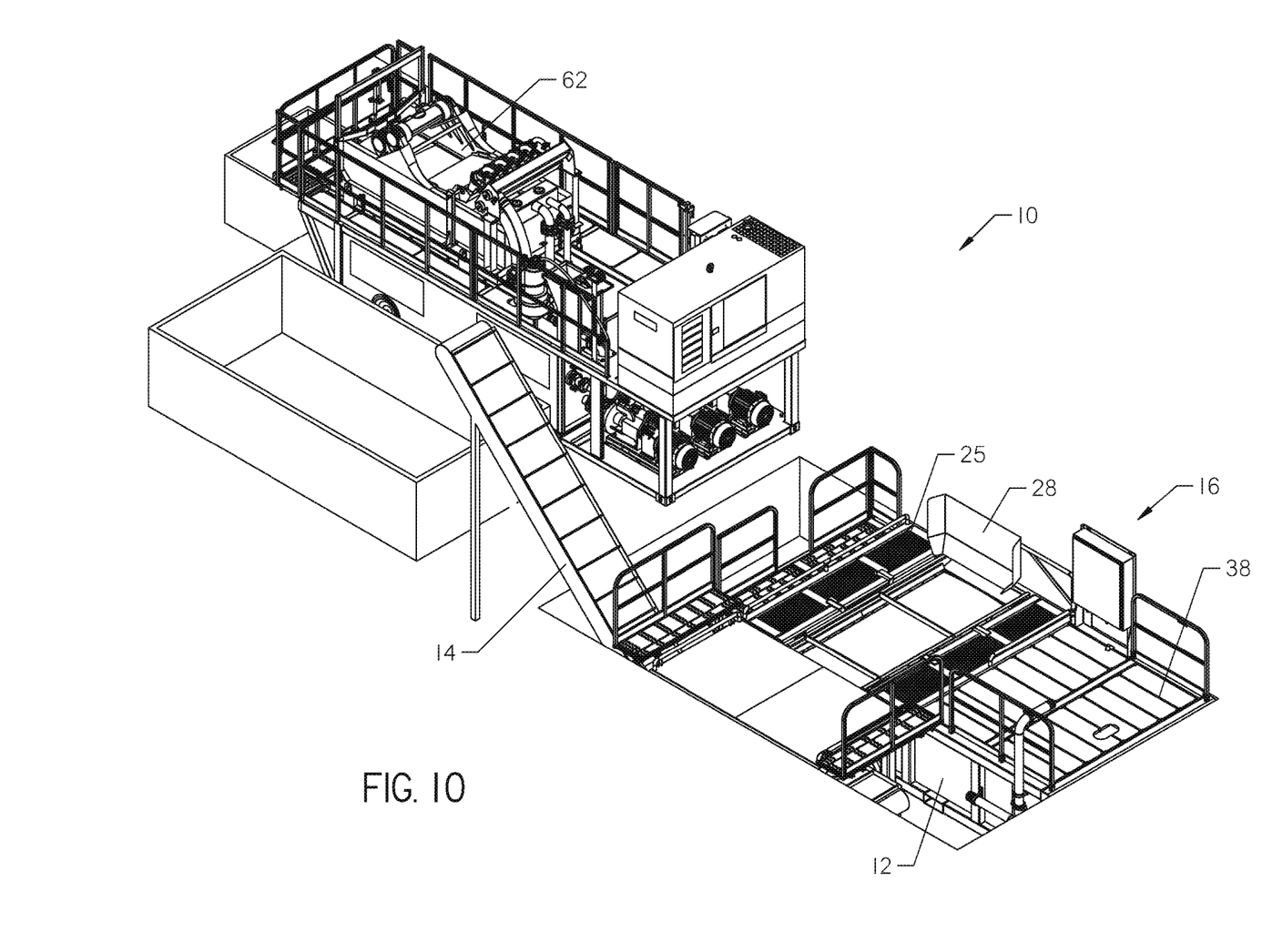
FIG. 10 is an overhead isometric view of a below-ground material processing system.

The tank 12 may be free-standing, as shown in FIG. 1, or may be totally or partially below-ground. By providing a ramp 18 on each side of the dumping stations 16, a truck 21 or trailer 22 may move entirely in one direction to a dumping station 16. An entire length of the system 10, comprising two ramps 18 and a dumping station 16, may be traversed by a tank 20. FIG. 10 shows the system 10 of FIGS. 1-7 in a below-ground configuration.

Figure 2:
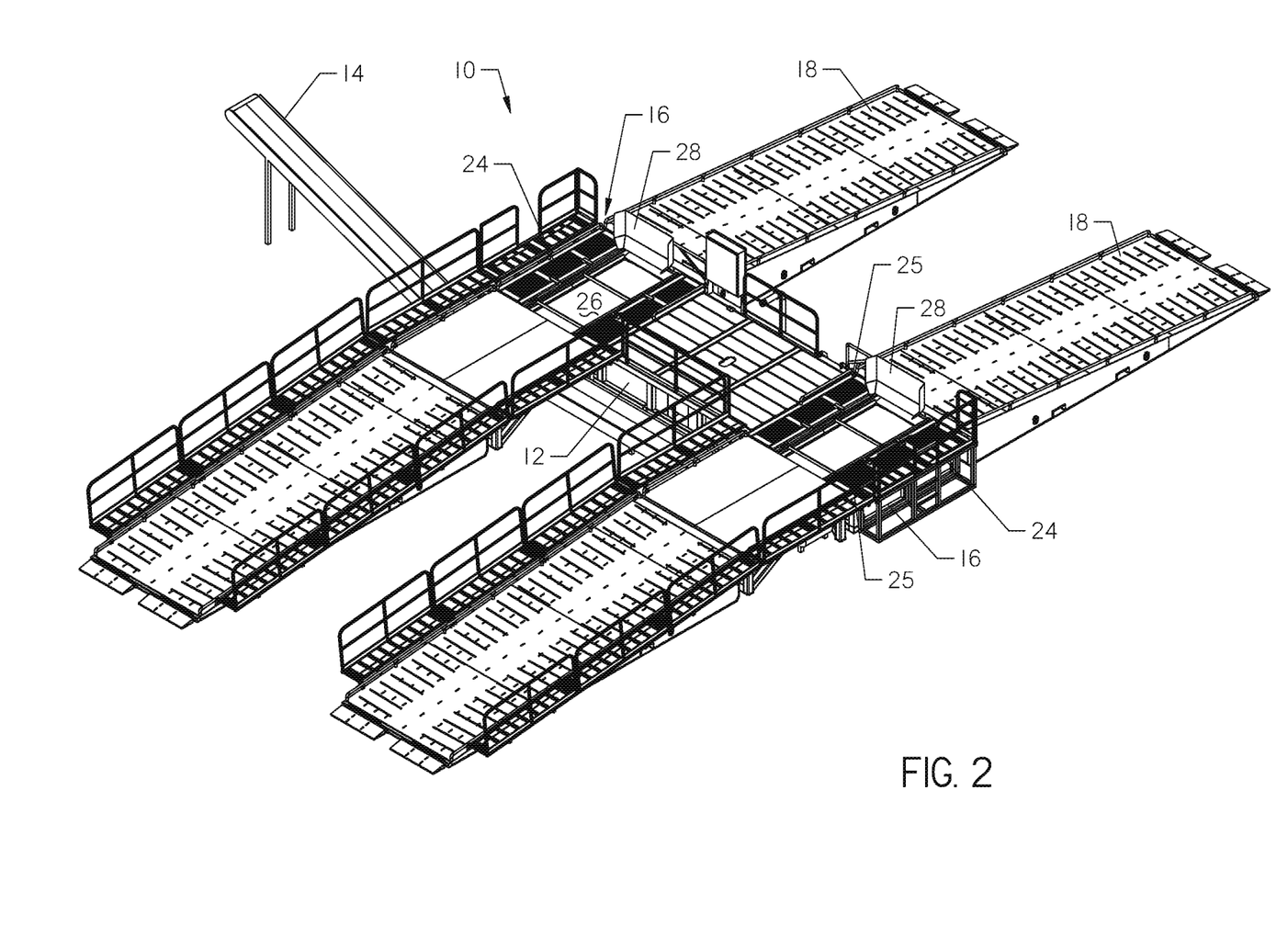
FIG. 2 is an overhead isometric view of the material processing system of FIG. 1 with the truck and trailer removed.

With reference to FIG. 2, the system 10 is shown with the vehicle tanks 20 removed. As shown, the dumping stations 16 comprise a bridge 24 and a gap 26. The bridge 24 may comprise two tracks 25 roughly equivalent to the wheel base of the truck 21 or trailer 22. The gap 26 is disposed between the two tracks 25 and allows dumping of material from a vehicle tank 20 positioned at the dumping station 16 without obstruction. A gap 26 of approximately four feet may be satisfactory to provide clearance between the tracks 25. In this way, the tracks 25 and gap 26 provide a partially open platform 27 for dumping material from the vehicle tank 20 to the processing tank 12. FIG. 10 shows a similar dumping station 16 below ground.

One or more shields 28 may be provided at an end of the dumping station 16 to deflect material from a tank away from a ramp 18 and into the processing tank 12. Preferably, a shield 28 may be provided at each end of the dumping station 16 such that identical operation is possible in either direction of tank 20 travel. The shield 28 minimizes the amount of material from the vehicle tank 20 that fails to enter the processing tank 12.

Figure 3:
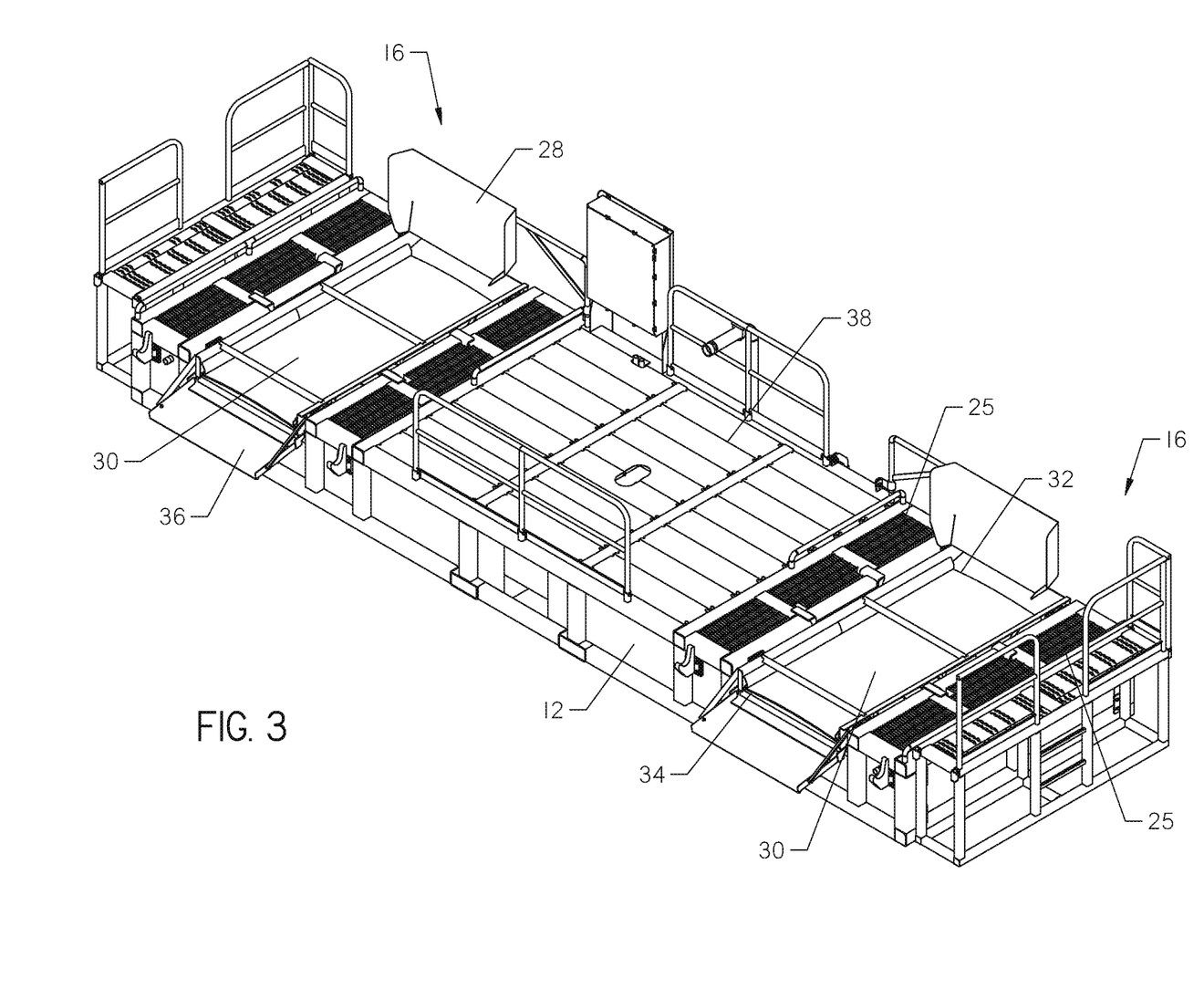
FIG. 3 is an overhead view of a dumping station for use with the system of claim 1.
Figure 4:
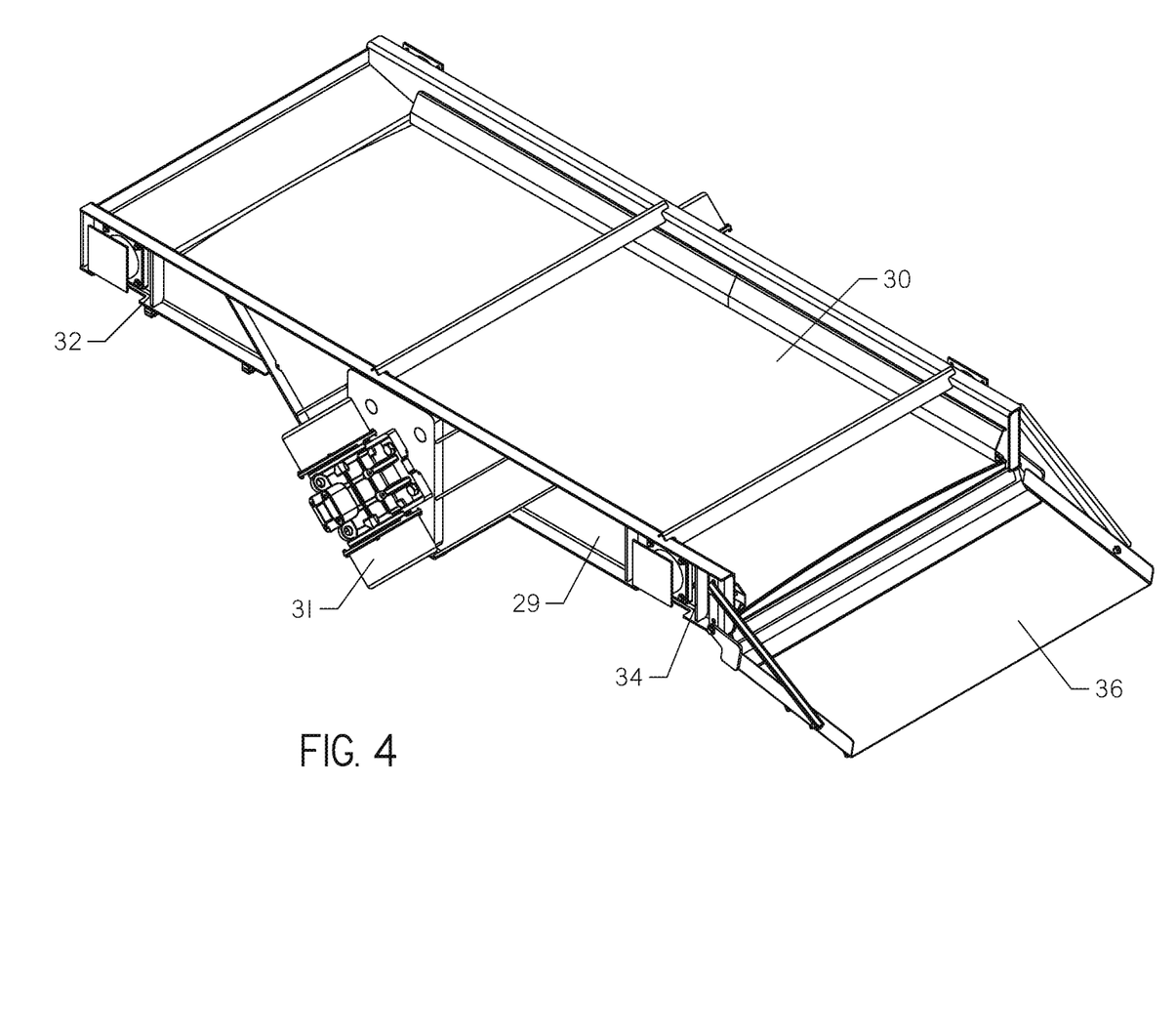
FIG. 4 is an isometric view of a vibratory screen frame for use with the dumping station of FIG. 3.

With reference now to FIGS. 3-4, the processing tank 12 comprises a screen 30. The screen 30 is preferably located within the gap 26. As shown, the screen 30 is recessed below the level of the tracks 25. A "cattle guard" (not shown) or other structural protection may be provided above the screen 30 to prevent damage from vehicles and falling debris.

The screen 30 may be vibrated or conveyed toward the material conveyer 14. As shown in FIG. 4, a vibrator 31 and the screen 30 are supported by an integral screen frame 29. The deposited material is conveyed due to vibration of the vibrator 31 imparted on the screen frame 29 and due to a slope of the screen 30. The screen 30 preferably has a mesh size (not shown) that allows fine particulates and liquids, such as that found in bentonite drilling fluid, to pass through the screen. Course particulates are transported to the conveyer 14 (FIGS. 1-2). The mesh size is preferably three eighths of an inch, though other mesh sizes may be utilized depending on the requirements of the separation process.

While a vibrator 31 is shown in the figures for use with the screen 30, it should be understood that a conveyable screen system such as a fertilizer chain may be utilized without departing from the spirit of the invention. Additionally, the screen 30 may be static, and a chain or other apparatus can drag particulates across the screen for disposal on the conveyor 14 or otherwise.

Course particulates unable to pass through screen 30 are conveyed from a dump end 32 of the screen to a chute end 34. The material conveyor 14 is disposed near the lower chute end 34 of the screen 30. A chute 36 is disposed at the chute end 34 of the screen 30. The chute 36 angles down from the chute end 34 to the material conveyer 14 (FIGS. 1-2). The screen 30 may also be tiltable, such that the slope of the screen from the dump end 32 to the chute end 34 may be increased after the slurry has remained on the screen for an acceptable working time to urge the particulates to the chute 36.

The screen 30 may be modified to increase or decrease the working time of the material deposited thereon. For example, increasing the slope from dump end 32 to chute end 34 decreases working time for material, which increases the processing capacity of the screen 30 but results in wetter material in the material conveyer 14. Conversely, a "flatter" screen 30 results in more working time, which may decrease available throughput but improve separation, resulting in drier particulates in the conveyer 14. Solids removed by the conveyer 14 are usually considered dry enough for typical disposal in a landfill or on a surface of the ground.

A platform 38 is disposed between the dumping stations 16 to allow servicing of the screens 30, vibrators 31, and processing tank 12 components. The platform 38 is accessible via the catwalk 19 (FIG. 1).

Figure 5:
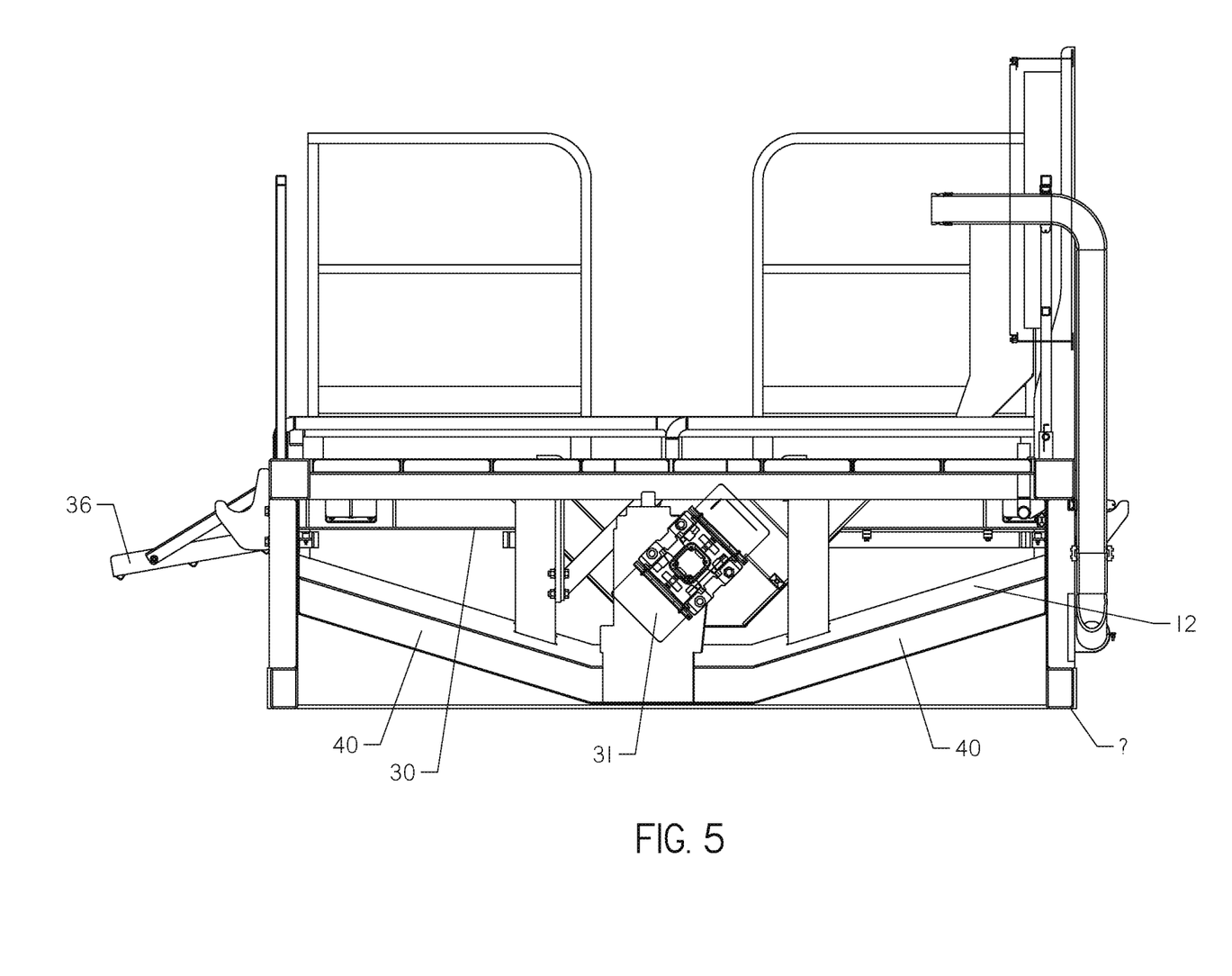
FIG. 5 is a sectional side view of the dumping station of FIG. 3.

With reference now to FIG. 5, the processing tank 12 of the system comprises a sloped portion 40. Remaining fluid falls through the screen 30 into the processing tank 12. The fluid travels down the sloped portion 40 to the bottom of the tank 12. Agitators (not shown) or other mechanisms may be used to encourage the fluid to settle in the bottom of the tank 12. The bottom of the tank 12 may be located between two sloped sides as shown in FIG. 5. Alternatively, one sloped side may urge the fluid to one side of the tank 12.

Figure 6:
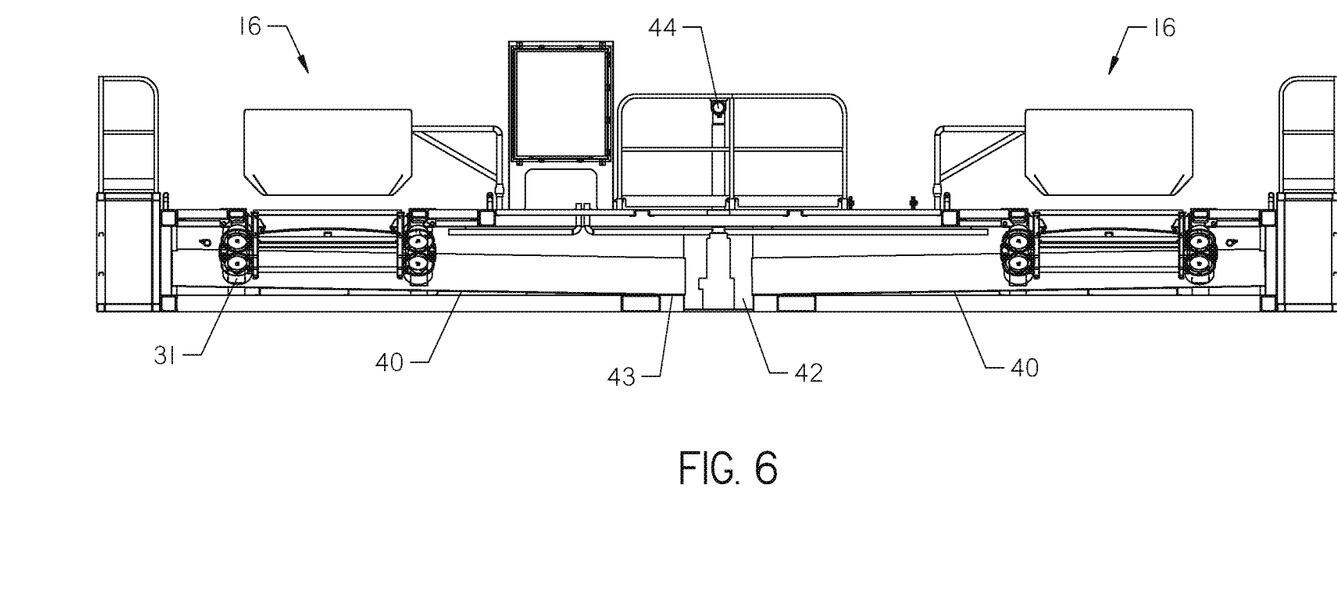
FIG. 6 is a sectional front view of the dumping station of FIG. 3.
Figure 7:
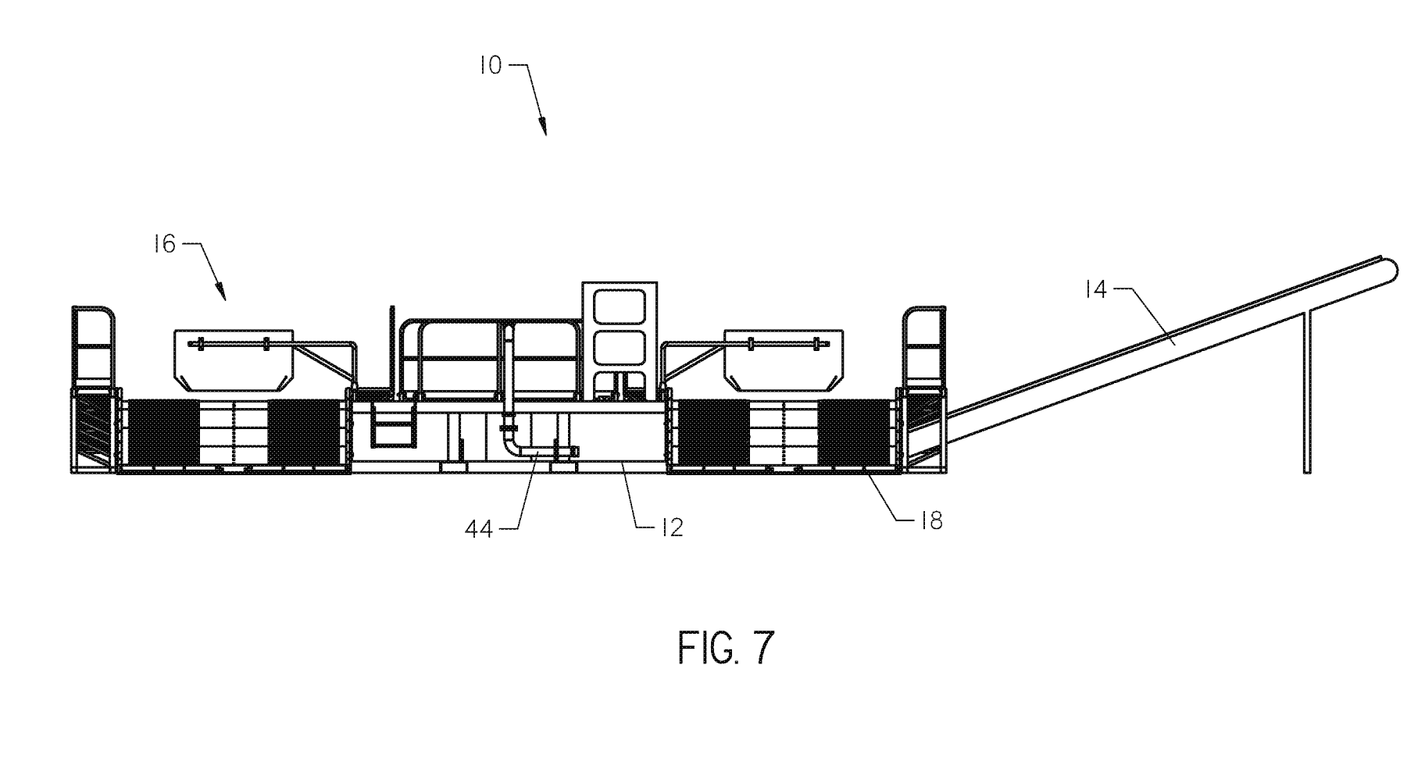
FIG. 7 is a front view of the system of FIG. 1.

With reference to FIG. 6, a cross-section of the tank 12 is shown. The tank's sloped bottom 40 not only slopes towards the bottom of the tank (FIG. 5) but also to a center location 43 between the two dumping stations 16. At least one pump 42 is disposed at the center location 43 within the tank 12. One of skill in the art will appreciate that the center location 43 may preferably be the lowest point within the tank. The pump 42 may preferably be a sump.

The pump 42 displaces fluid that settles at the bottom of the tank 12 and forces it into a conduit 44. Fluid in the conduit 44 may be suitable for reuse, or may be further processed.

As shown in FIGS. 1-7, the system is free-standing, having at least one dumping station 16, and at least two outlets. The outlets are the conveyer 14 and the conduit 44. While it may be preferable to provide the system 10 at a permanent location, the system may be modular and portable. A modular system 10 may be customizable with additional dumping stations 16 and higher capacity conveyers 14, screens 30, and pumps 42. Additionally, portions of the system 10, such as the tank 12 and ramps 18, may be portable such that the system can be disassembled, moved, and reassembled at an advantageous location. In all the embodiments described herein, the screen 30 and tank 12 are disposed directly below the vehicle travel path.

Figure 8:
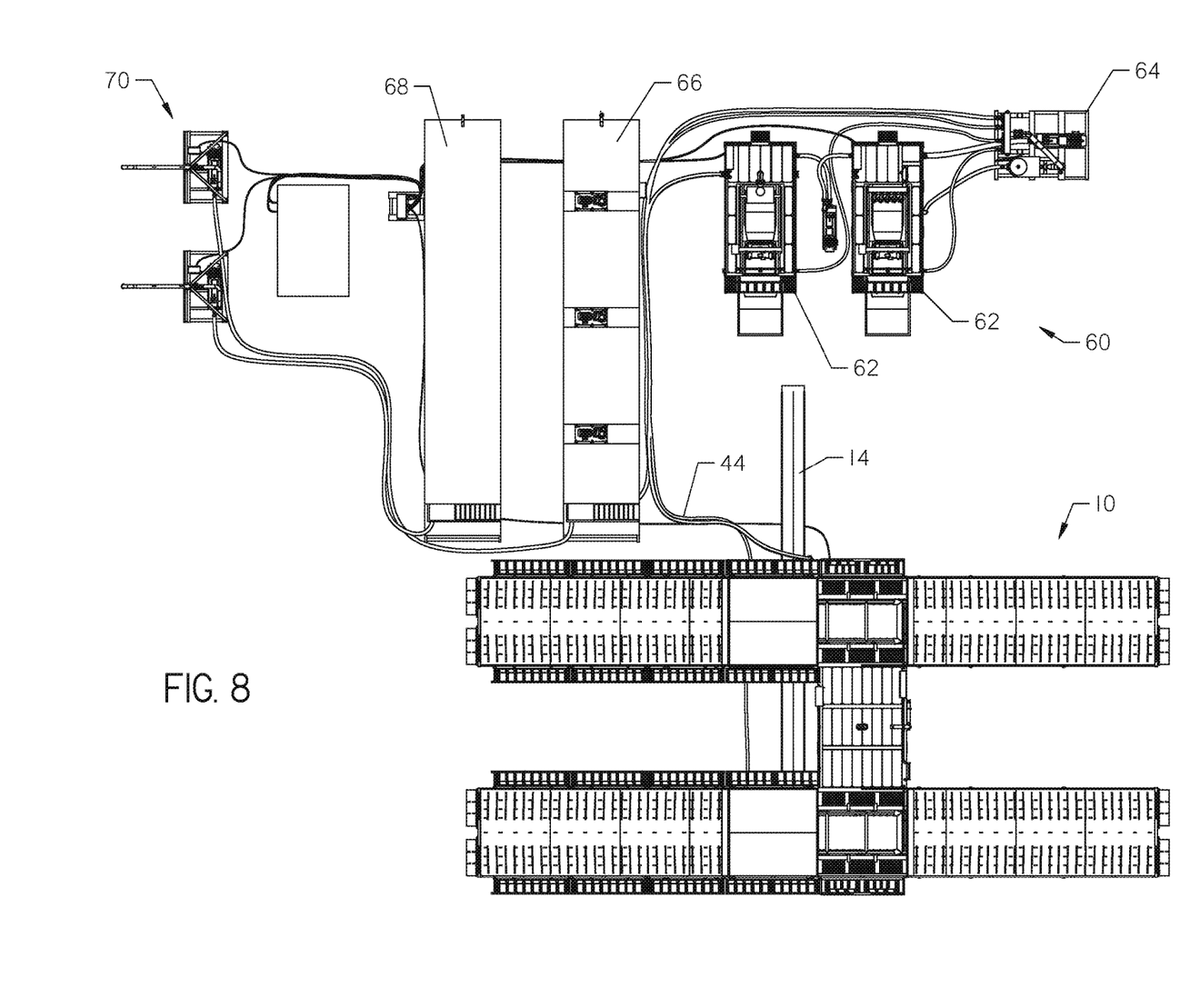
FIG. 8 is an overhead plan view of the system of claim 1 connected to an auxiliary cleaner and filling station.

With reference now to FIG. 8, an additional cleaner 60 is shown downstream of the system 10. The cleaner 60 may comprise a reclaimer 62, a mixer 64, and a mud tank 66. As shown, the cleaner 60 comprises two reclaimers 62. Mud from the conduit 44 is deposited at the reclaimer 62, which may be any known mesh reclaimer system, including that found in U.S. Pat. No. 9,662,599, issued to Sewell, the contents of which are incorporated herein by reference in its entirety.

The reclaimer 62 (or plurality of reclaimers), as shown in greater detail in FIG. 10, further separates liquid and solid particulate from the conduit 44 through screen separation. Mesh sizes within the reclaimer 62 may be less than an eighth of an inch. If a series of reclaimers 62 are used, each successive reclaimer 62 may comprise a smaller mesh size. Larger particulate matter may be removed from the system and dried. Small particulates removed from the reclaimer 62 may be reintroduced upstream, dried for use as fill, or discarded.

With reference again to FIG. 8, fluid from the reclaimer 62 is pumped into the mixer 64. The fluid is monitored to determine whether its properties are similar to new, clean, ready to use drilling fluid. If excess particulate passes through the reclaimer 62 into the mixer, a portion of the fluid in the mixer may be returned to the reclaimer system for further processing. When fluid properties are appropriate, clean, ready to use drilling fluid is then stored in the mud tank 66 with agitators to keep the fluid in ready to use condition.

Adjacent to the mud tank 66 is a fresh water tank 68. Both the mud tank 66 and the fresh water tank 68 are connected to a pumping station 70 which can be used to re-fill the now empty auxiliary tanks 17 on a truck 21 or trailer 22 (FIG. 1).

Alternatively, a centrifuge (not shown) may aid in cleaning fluid in the mud tank 34. Changes may be made to this system without departing from the spirit of the invention. For example, the entire system 10 may be computer controlled to automate fluid flow and leveling from tank to tank. A speed of the conveyor 14 and level of the screen 30 may be modified to increase or decrease working time for material.

Figure 9:
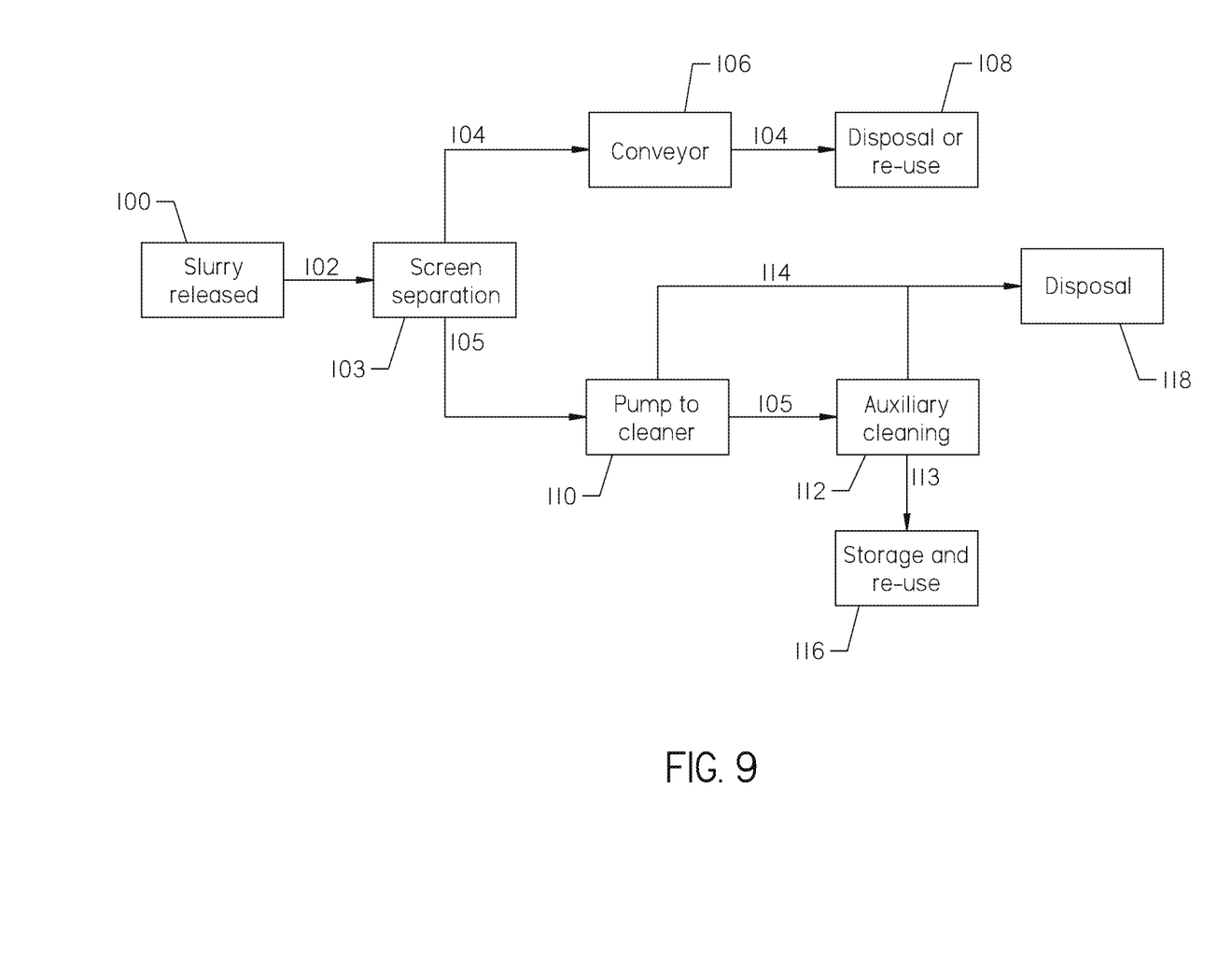
FIG. 9 is a process flow chart showing the flow path of slurry material deposited in the system.

With reference to FIG. 9, the flow of slurry material deposited into the system 10 is shown. Slurry is released at too by the vehicle tank 20, initiating a slurry material flowpath 102. The slurry material flowpath 102 extends to and terminates at the screen 30. Slurry material is separated at 103 by the screen 30 into a particulate-rich flowpath 104 and a fluid flowpath 105. It should be understood that the fluid-rich flowpath 105 will contain entrained particulates. The fluid-rich flowpath 105 is distinguished from the particulate-rich flowpath 104 by the presence of most of the fluid from the slurry flowpath 102 and a smaller average particle size.

The particulate-rich flowpath 104 is conveyed away from the processing tank 12 by a conveyor 14 at 106. The particulates in the particulate-rich flowpath may be disposed of or re-used as fill at 108.

The fluid-rich material is pumped at 110 to the auxiliary cleaner 60 by the pump 42. Further cleaning of the fluid-rich material occurs in the auxiliary cleaner 60 at 105, separating the fluid-rich stream 105 into a drilling fluid stream 113 and a small particulate-rich stream 114. As described with reference to FIG. 8, the auxiliary cleaner 60 may comprise reclaimers 62 and mixers 64. The auxiliary cleaner 60 may also include centrifuges (not shown) and other known separators.

The drilling fluid stream 113 terminates at the mud tank 66, where it is stored for re-use at 116. The small particulate stream 114 may be reintroduced within the auxiliary cleaner 60 or disposed at 118, either with the particulate-rich stream 104 or otherwise.

The scope of the claims should not be limited by the preferred embodiments set forth in the examples, but should be given the broadest interpretation consistent with the description as a whole.

The invention claimed is:

1. A system comprising:
   a vehicle travel path defined by a first ramp, a second ramp, and a dumping station;
   wherein the dumping station is disposed between the two ramps and comprises:
      parallel tracks for supporting a vehicle interposed between the first ramp and the second ramp along the vehicle travel path, the parallel tracks having a gap disposed therebetween;
      a screen disposed between the parallel tracks within and below the gap;
      a material conveyor disposed proximate the screen;
      a tank disposed directly beneath the screen and having an open upper end spanned by the parallel tracks; and
      a shield disposed above a level of the tank and the parallel tracks and configured to be disposed between a path of the parallel tracks;
   wherein the system defines a slurry material flowpath above and on the screen wherein the screen separates the slurry material flowpath into a particulate-rich flowpath and a recovered fluid-rich flowpath, wherein the material conveyor is adapted to carry particulates along a portion of the particulate-rich flowpath.

2. The system of claim 1 wherein the tank is disposed at least partially;
   above the ground.

3. The system of claim 1 wherein the tank has a sloped bottom.

4. The system of claim 1 wherein the fluid-rich flowpath comprises at least a portion of the tank.

5. The system of claim 1 further comprising a vehicle containing a slurry material, wherein the slurry material flowpath begins at the vehicle.

6. The system of claim 5 wherein the vehicle comprises a vacuum tank truck.

7. The system of claim 1 further comprising a pump in fluid communication with the tank.

8. The system of claim 7 further comprising an auxiliary fluid reclaimer wherein the fluid-rich flowpath is separated into a drilling fluid flowpath and a small particulate flowpath at the auxiliary fluid reclaimer.

9. The system of claim 8 further comprising a fluid tank disposed downstream of the auxiliary fluid reclaimer on the drilling fluid flowpath.

10. A method of using the system of claim comprising:
    driving a vehicle forward along the vehicle travel path across the first ramp to the dumping station;
    supporting at least a portion of the vehicle at the dumping station;
    thereafter, receiving a slurry material flowpath from the vehicle at the screen;
    separating the slurry material flowpath into the recovered fluid-rich flowpath and the particulate-rich flowpath with the screen;
    receiving the recovered fluid-rich flowpath in the tank; and
    cleaning at least some of the recovered fluid-rich flowpath to prepare a drilling fluid.

11. The method of claim 10 further comprising pumping the recovered fluid-rich flowpath to an auxiliary cleaner and cleaning the recovered fluid-rich flowpath with the auxiliary cleaner to reclaim drilling fluid from the recovered fluid-rich flowpath.

12. The method of claim 11 further comprising transferring the drilling fluid to a mud tank.

13. The method of claim 10 wherein the tank is at least partially disposed above ground.

14. The method of claim 10 further comprising transporting the particulate-rich flowpath on the conveyor.

15. A dumping station for receiving material from a transport vehicle, the dumping station comprising:
    a tank for receiving material discharged from a transport vehicle, the tank having a rectangular footprint and a length greater than its width;
    a shield disposed above the tank;
    a first track for supporting transport vehicles which move above the tank, the first track being orthogonal to the length of the tank; and
    a second track for supporting transport vehicles which travel above the tank, the second track being spaced apart from the first track and orthogonal to the length of the tank, the shield being configured for positioning above the tank between the first and second tracks; and,
    a screen disposed above the tank and between the first track and the second track, the screen being configured to receive a slurry material flowpath from the transport vehicle and to separate the slurry material flowpath into a particulate-rich flowpath and a recovered fluid-rich flowpath.

16. The dumping station of claim 15, further comprising:
    a material conveyor disposed proximate the screen, the material conveyor being configured to carry particulates along a portion of the particulate-rich flowpath.

17. A system, comprising:
    a first ramp;
    a second ramp; and
    the dumping station of claim 15, wherein the first ramp, second ramp, and dumping station define a vehicle travel path that is orthogonal to the length of the tank.

18. The dumping station of claim 15 further wherein the first and second tracks form a first vehicle travel path, the dumping station further comprising:
- a third track for supporting transport vehicles which travel above the tank, the third track being orthogonal to the length of the tank; and
- a fourth track for supporting transport vehicles which travel above the tank, the fourth track being orthogonal to the length of the tank,
- the third and fourth tracks forming a second vehicle travel path.

19. The dumping station of claim 15 further comprising a conveyor extending proximate the tank to remove material from the dumping station.

\* \* \* \* \*

UNITED STATES PATENT AND TRADEMARK OFFICE
CERTIFICATE OF CORRECTION

PATENT NO. : 10,794,129 B2
APPLICATION NO. : 15/661289
DATED : October 6, 2020
INVENTOR(S) : Avalon et al.

It is certified that error appears in the above-identified patent and that said Letters Patent is hereby corrected as shown below:

In the Specification

Column 4, Line 67, please delete "too" and substitute therefore "100".

In the Claims

Column 5, Claim 2, Line 2, please delete ";".
Column 6, Claim 10, Line 1, please insert --1-- after the word "claim".

Signed and Sealed this
Seventeenth Day of November, 2020

Andrei Iancu
*Director of the United States Patent and Trademark Office*